United States Patent [19]
Loqvist

[11] 3,787,943
[45] Jan. 29, 1974

[54] ROLLER FOR HOT AND COLD ROLLING AND METHOD OF MAKING THE SAME

[75] Inventor: Kaj Ragnar Loqvist, Fagersta, Sweden

[73] Assignee: Fagersta Aktiebolag, Fagersta, Sweden

[22] Filed: Dec. 21, 1971

[21] Appl. No.: 210,440

[30] Foreign Application Priority Data
Jan. 8, 1971 Sweden.................................. 170/71

[52] U.S. Cl. ................................................. 29/125
[51] Int. Cl. ............................................ B21b 31/08
[58] Field of Search ........... 29/132, 130, 129.5, 125

[56] References Cited
UNITED STATES PATENTS

| | | | |
|---|---|---|---|
| 1,413,436 | 4/1922 | Vedder | 29/125 |
| 2,342,159 | 2/1944 | Moran | 29/125 |
| 3,432,902 | 3/1969 | Rackoff et al. | 29/125 |
| 3,435,499 | 4/1969 | Rackoff et al. | 29/125 |
| 3,577,619 | 5/1971 | Strandel | 29/125 X |
| 3,667,096 | 6/1972 | Edsmar | 29/125 |
| 3,609,849 | 10/1971 | Krol | 29/132 |

*Primary Examiner*—Alfred R. Guest
*Attorney, Agent, or Firm*—Larson, Taylor & Hinds

[57] ABSTRACT

A roller for hot and cold rolling is made by taking a hard metal ring, the cross-section of which decreases radially outwardly, and casting around the inside and at least the inner part of the radial sides thereof an annular hub of ferro alloy. After casting, the hub and the hard metal ring are cooled, the hub shrinking more than the hard metal ring so as to exert compressive forces thereagainst to hold the same in place.

4 Claims, 4 Drawing Figures

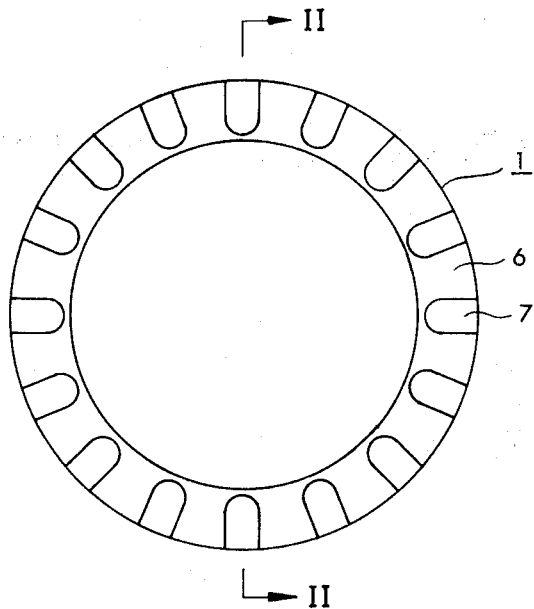
FIG. 1
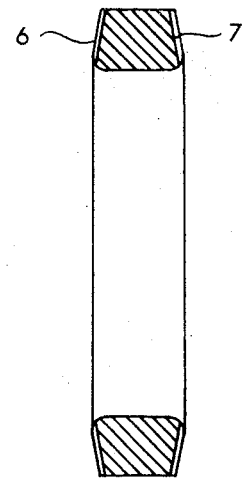
FIG. 2
FIG. 3
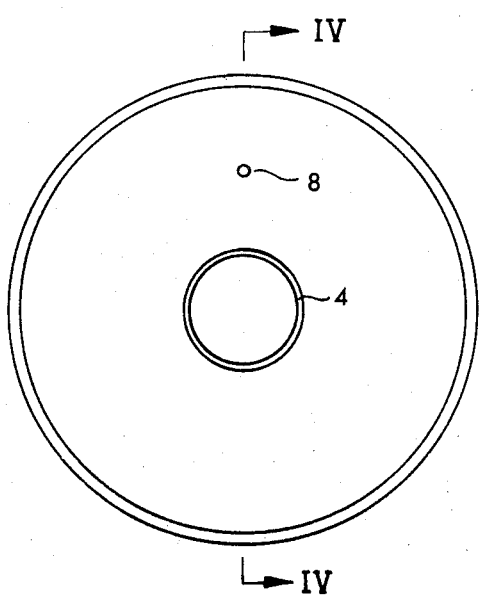
FIG. 4
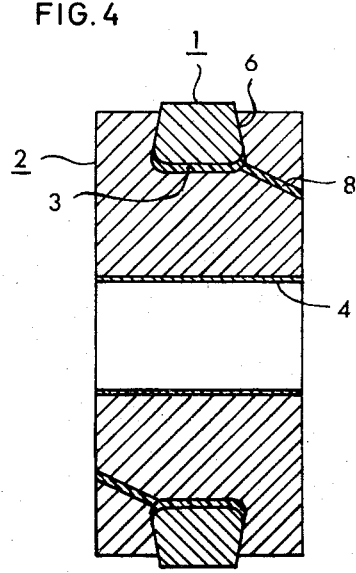

ROLLER FOR HOT AND COLD ROLLING AND METHOD OF MAKING THE SAME

The present invention refers to a roller for hot-rolling and/or cold-rolling, in which the rolling surface is formed by a hard metal ring on a roller body or hub of a ferro alloy, for instance steel. In manufacturing rollers having a rolling surface of hard metal it is for economical reasons desirable that the amount of hard metal is as low as possible. Generally the hard metal ring is connected to the roller body by a mechanical joint means. This necessitates small tolerances, which results in cost demanding manufacturing operations as for instance grinding. Further, assemblies of this kind are sensitive to temperature variations, and the hard metal ring has a tendency to burst.

The object of the invention is to eliminate the disadvantages of prior known assemblies of this kind, and it is thereby characterized, that the roller body is cast around the hard metal ring, and that the cross sectional width of the hard metal ring increases from the rolling surface towards the centre of the roller, so that a pre-stressing is obtained of the hard metal ring when located in the body or hub of a ferro alloy, for instance steel.

Since the roller body or hub is cast around the hard metal ring it is no longer necessary to grind same before the mounting operation as in prior known hard metal roller assemblies. The hard metal ring is kept secured in the hub due to the compressive stresses which are exerted against the side edges of the hard metal ring by the hub. The compressive stresses derive from the difference in coefficients of expansion between the hard metal and the ferro alloy or steel. The magnitude of the compressive stresses may be regulated for instance by varying the inclination of the side edges of the hard metal ring in relation to the shaft of the roller. The side edges may also be wave-formed or formed with grooves or other unevennesses in order to get a better transmission of the torque between the hard metal ring and the hub. The casting may be done in a sand mould or cast iron mould or in any other known way.

An example of the cast around of a hard metal ring in a hub of a ferro alloy or steel in accordance with the invention will be described in the following.

The cast iron mould is firstly treated with for instance an emulsion of oil and graphite. The cast iron mould with the hard metal ring is put into a furnace and is preheated to for instance 600° C for the prevention of blister formation in the casting and for the reduction of the effects due to the differences in the thermal expansivities. The heating should take place in an atmosphere of protective gas or vacuum for preventing oxidizing of the hard metal ring and the cast iron mould. Then the ferro alloy lump is poured into the mould. The successive cooling should take place slowly in order that the ferro alloy shall not be brittle. After a suitable time the ferro alloy/hard metal piece is removed from the cast iron mould and is packed into a heat isolating material. The hard metal piece may also be packed into the heat isolating material without having been removed from the cast iron mould.

In the accompanying drawings is shown a hard metal ring assembly,

FIG. 1 is a side-view of a hard metal ring,

FIG. 2 is a cross-section along the line II — II of FIG. 1.

FIG. 3 is a side-view of a roller assembly according to the invention, and

FIG. 4 is a cross-section along the line IV — IV of FIG. 3.

In the drawings the reference number 1 indicates a hard metal ring intended to have cast around it the roller body or hub 2 of a ferro alloy, for instance steel. The hard metal ring 1 is provided with grooves 7 on the opposite side edges thereof. It is evident from FIGS. 2 and 4, that the side edges 6 of the hard metal ring 1 converge somewhat in the direction radially outwards. In FIGS. 3 and 4 the hard metal ring 1 is shown with the body or hub 2, cast around it and during the cooling the ferro alloy or steel shrinks more than the hard metal, and therefore a cleft is formed under the hard metal ring 1 between same and the body 2.

After the body or hub has cooled the assembly of the ferro alloy body and the hard metal piece are turned clean and holes 8 are bored in the body for injecting for instance a re-inforced epoxi base thermosetting resin or any other suitable support material in the cleft 3 under the hard metal ring. During the cooling following the casting correct temperature difference is kept between the hard metal and the ferro alloy lump (higher for the hard metal) by adding heat to the hard metal ring while the centre of the casting is cooled for instance by means of air.

Because of the axial and radial mounting of the hard metal ring 1 in the body 2 water cooling, which is normally necessary, can be eliminated or reduced. By suitably providing cooling rings or cooling flanges on the side edges of the hub the temperature of the roller may be controlled. For the purpose of preventing temperature transportation from the rolling surface of the hard metal ring 1 to the roller shaft the part of the hub 2 engaging the shaft may be provided with a heat protection shell 4 of for instance titanium oxide or any other suitable heat insulating material.

By utilizing a cast iron mould enabling a cooling of the centre of the hub during the casting the effect of the differences in thermal expansivities can be controlled. The basic feature thereby is that the temperature differences are kept between the ferro alloy and the hard metal parts. The temperatures of the ferro alloy and the hard metal respectively are chosen with respect to their thermal expansivity, i.e., the ferro alloy or steel is kept at lower temperature than the hard metal. This may be done for instance by adding heat to the outside of the cast iron mould by means of for instance high frequency currents while the centre thereof is cooled by means of for instance air or water.

The advantages of the roller assembly according to the present invention compared with prior known rollers are above all that it is cheaper to manufacture, essentially less sensitive to temperature increases, and it has a longer duration due to the fact that water cooling of the rolling surface may be eliminated or reduced, which means that the temperature gradients between the rolling material and the roller become less strong.

I claim:

1. A roller for hot and cold rolling comprising: a hard metal ring, the cross-section of which decreases radially outwardly, a one-piece cast in annular ferro alloy hub, the radial inner surface and the inner part of the sides of the hard metal ring being positioned within the outer circumference of the hub with the latter stressed against the sides of the hard ring to hold it in place in the hub, wherein an annular cleft is formed between the hard metal ring and the ferro alloy hub adjacent the inside of the hard metal ring.

2. A roller according to claim 1, in which the side surfaces of the ring have radially extending grooves formed therein.

3. A roller according to claim 1, including a supporting material located in said cleft.

4. A roller according to claim 1, including cooling flanges formed on the exterior of the hub.

* * * * *